Figure 1:
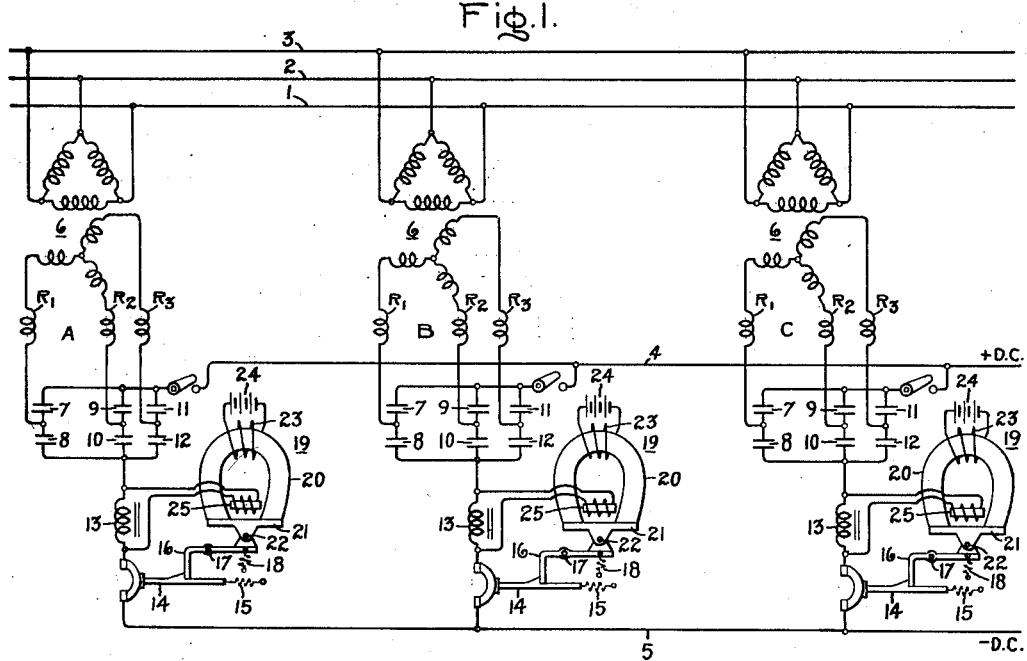

April 27, 1954

A. SCHMIDT, JR 2,677,092

REVERSE CURRENT PROTECTIVE SYSTEM
FOR DIRECT CURRENT CIRCUITS
Filed Dec. 1, 1951

Inventor:
August Schmidt, Jr.,
by Ernest H. Britton
His Attorney.

Patented Apr. 27, 1954

2,677,092

UNITED STATES PATENT OFFICE 2,677,092

REVERSE CURRENT PROTECTIVE SYSTEM FOR DIRECT CURRENT CIRCUITS

August Schmidt, Jr., Schenectady, N. Y., assignor to General Electric Company, a corporation of New York Application December 1, 1951, Serial No. 259,395

10 Claims. (Cl. 321—12)

This invention relates to reverse current protective systems for direct current circuits and more particularly to an arrangement for limiting the magnitude of the reverse current resulting from a fault condition to a relatively small value for a time sufficiently long to permit clearance of the fault condition by high speed means which responds very quickly to a condition which is indicative of the existence of the fault condition.

While the principles of the invention are applicable to a single direct current circuit comprising a source and a regenerative load, the invention is hereinafter described in connection with a plurality of direct voltage sources connected in parallel. More specifically, the invention is described in detail as applied to a plurality of parallel connected mechanical converter units interconnected between an alternating current circuit and a direct current circuit.

One arrangement commonly used for protecting parallel connected mercury arc rectifiers utilizes a high speed reverse current circuit breaker in the direct current circuit of each rectifier unit. Thus upon the occurrence of an internal fault in one rectifier unit, the reverse fault current fed to that unit from the other rectifiers trips the breaker of the faulty rectifier and removes such rectifier from the circuit. If a protective scheme using reverse current circuit breakers is applied to a mechanical rectifier system, the current in the normal rectifiers is likely to rise to a value in excess of the commutation limit of the rectifiers before the reverse current circuit breaker clears the faulty rectifier from the system. Furthermore, a protective system for use in conjunction with mechanical rectifiers or converters should incorporate means for limiting the magnitude of fault current to a safe value during the time between the initiation of the internal fault condition and the clearance of the fault by protective circuit breakers since mechanical converters do not have inherent current limiting characteristics as do electronic devices.

One object of this invention is to provide an improved reverse current protective system for use in conjunction with direct current circuits.

Another object of this invention is to provide an improved reverse current protective system for use in conjunction with electrical converting equipment of the mechanically operated type.

This invention in one form as applied to parallel connected mechanical rectifiers utilizes a non-linear reactor in series with each mechanical rectifier unit for the purpose of limiting the magnitude of the reverse current through a rectifier unit for a brief period of time after a reversal of current occurs therethrough, and means responsive to the voltage across the reactor is utilized to clear the associated rectifier from the system upon the occurrence of the voltage or fault condition which effects the reverse flow of current in the reactor. Such a reactor, of course, must be constructed so as to limit the magnitude of the current for a time sufficient to allow operation of the protective means and the voltage across such a reactor inherently is adaptable for use as a means for indicating the existence of a fault or for promptly initiating a control operation.

For example, during normal conditions when current is flowing in a normal direction, the reactor saturated and the voltage drop thereacross is very low. When the voltage from the associated rectifier is reduced below that of the remaining rectifiers, there is a tendency for the reactor current to reverse direction and for the reactor to become saturated with a polarity opposite from normal. During the interval when the polarity of the reactor is being reversed, the reactance of the reactor and the voltage thereacross are increased to a substantial value until the reactor becomes saturated at a polarity opposite from normal at which time the voltage and reactance of the reactor are reduced to very low values. During the period when the voltage across the reactor is of a substantial value, voltage responsive means can be actuated thereby.

Figure 2:
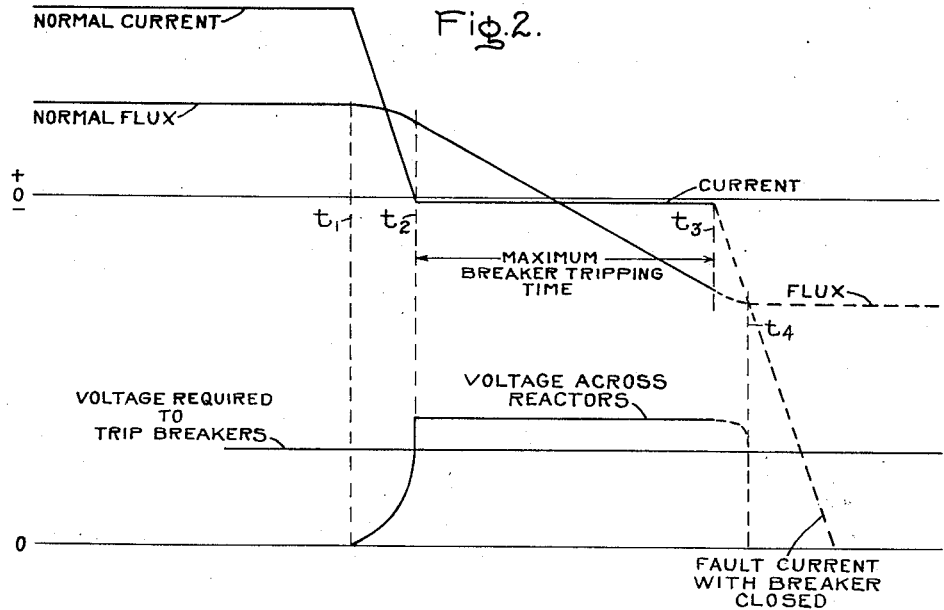

The invention will be better understood from the following description when taken in conjunction with the accompanying drawings in which Fig. 1 is a schematic representation of a plurality of mechanical converters connected in parallel and which utilize the principles of the invention, and in which Fig. 2 is a family of curves to aid in understanding the principles of the invention.

With reference to Fig. 1, three mechanical converters A, B, and C are shown interconnected between an alternating current circuit comprising conductors 1, 2, and 3 and a direct current circuit comprising conductors 4 and 5. Since the converters A, B, and C and the circuit elements associated therewith are identical, the circuit for only one converter will be described.

Converter A is connected to the alternating current circuit through transformer 6 and the commutating reactors $R_1$, $R_2$, and $R_3$. Converter A comprises mechanical contacts 7–12 which are schematically represented. Contacts 7–12 could be operated in any suitable manner, such as by the hydraulic means disclosed in application Serial No. 237,379 filed July 13, 1951, by John A. Favre, and assigned to the assignee of this invention. Connected between the converter unit A and the direct current line 5 is the iron core reactor 13 in series with a circuit interrupter 14.

Interrupter 14 is of the biased-open latched-closed type. The opening bias of interrupter 14 is represented by the spring means 15 and the interrupter is maintained in the closed position by means of the latch 16 which is pivotally mounted at 17 and which is biased by spring means 18 for rotation in the clockwise direction about pivot 17 to its unlatched position. Latch 16 is maintained in the latching position indicated by means of a suitable holding device, generally indicated at 19. As shown, this holding device 19 is an electromagnet provided with a magnetic circuit including a yoke member 20 and its associated armature 21. Armature 21 as indicated in the drawing is connected by a pin 22 with the latch member 16. The device 19 is magnetized by means of a coil 23 energized from any suitable source of direct current, such as the battery 24. Thus with the parts in the position indicated in Fig. 1, the latch 16 is maintained in the closed position due to the magnetic attraction between the armature 21 and the yoke 20.

Device 19 is provided with a tripping coil 25 which, when energized by a voltage produced by a reverse current through the associated reactor 13, diverts flux from the armature 21 in such a manner as to decrease the holding power of the yoke member 20. When this voltage exceeds a predetermined value relative to the normal value across the conductors 4 and 5, the holding power of the yoke member 20 is no longer sufficient to maintain the armature 21 in engagement with the yoke member 20 against the bias of the spring 18. Spring 18 then moves the armature 21 out of engagement with the yoke member 20 thereby to unlatch the circuit breaker 14. The breaker 14 then opens due to the action of its spring 15. A device such as the tripping device 19 is more fully disclosed and is claimed in U. S. Patent 2,188,803, Boehne, granted January 30, 1940, and assigned to the assignee of this invention.

In accordance with this invention, the iron core reactor 13 associated with one source of direct voltage, such as converter A, for example, is effective to limit the magnitude of reverse current tending to flow therethrough from other sources of direct voltage, such as converters B and C, and through the contacts of the breaker 14 due, for example, to an internal fault within the mechanical converter A. It will be understood that the tendency for the current to reverse in one of the reactors 13, such as that associated with converter A, for example, could be caused by an increase of direct voltage in converters B and C or by a reduction of voltage in converter A. One common cause for a reduction in voltage of one converter is an internal fault therein. If a single converter such as A is connected to a motor load having inertia, the principles of the invention would be applicable since the load would constitute a voltage source and there would be a tendency for the load to pump current back into the converter in response to a change in the normal relationship between the load voltage and the direct voltage of converter A such as could be caused by an internal fault in converter A.

Under normal conditions when all converters acting as rectifiers are supplying current to a direct current load, the reactors 13 are saturated, their impedance is low, and the voltage drop thereacross is almost zero. Upon the occurrence of an internal fault in device A, current tends to flow from devices B and C in a reverse direction through reactor 13 associated with a device A. The voltage across this reactor due to devices B and C immediately increases and tends to reverse the polarity of the reactor thereby increasing its impedance. The increase in voltage across reactor 13 associated with device A is used to energize the trip coil 25 thereby to open the associated interrupter.

The operation of the invention will be apparent from the curves shown in Fig. 2. In Fig. 2, the normal current through reactor 13 and through the contacts of interrupter 14 is indicated together with the normal flux of reactor 13 for the time before the time indicated $t_1$. Since the reactor is saturated and since the current is assumed to be substantially constant, there is but a nominal voltage across reactor 13 which is too small to be indicated in Fig. 2. Upon occurrence of a fault condition, or upon a change in the normal relationship between the voltage output from one rectifier such as A and the voltage across conductors 4 and 5 at time $t_1$, the current falls to zero and may even reverse direction as indicated during the time interval between $t_1$ and $t_2$. During this period of time, the flux in reactor 13 begins to decay while the voltage across reactor 13 builds up from a very low value corresponding to the voltage drop therethrough due to normal current in a normal direction to a maximum value at time $t_2$ due to the application of the voltage from converters B and C across reactor 13 associated with device A. During the interval of time between $t_2$ and $t_3$, the current is maintained at a relatively low value which, as indicated in Fig. 2, may be a small amount in the negative or reverse direction. During this period of time, the flux changes polarity and approaches a maximum in the negative direction. The voltage across reactor 13 is maintained at a maximum value from time $t_2$ to time $t_3$ and begins to decay slightly before time $t_4$ when the reactor becomes saturated at a polarity opposite from normal at which time the reactance of the reactor is of a very low value. The tripping device 19 normally would be arranged to respond to some voltage across reactor 13 such as is indicated in Fig. 2 and which is designated as "Voltage Required to Trip Breakers." Such a tripping voltage would be less than the maximum, of course. Should the breaker fail to open, the fault current will increase in a negative direction from the small value indicated at time $t_3$ to some very large value as indicated by the dotted line curve labeled "Fault Current With Breaker Closed." Thus if damage to converters such as B and C is to be avoided due to a fault occurring within converter A, for example, it is necessary to open circuit breaker 14 associated with converter A some time between the time $t_2$ and the time $t_3$, it being understood that reactor 13 effectively limits the magnitude of current to a small harmless value between times $t_2$ and $t_3$. Furthermore, if the high speed tripping device 19 is properly constructed, it will cause opening of the breaker some time after time $t_2$ and before time $t_3$ since an adequate signal is supplied to device 19 throughout this period. In order to accomplish high speed tripping, the device 19 and particularly the tripping coil 25 would simply be constructed in accordance with known principles to operate sufficiently rapidly.

In order to insure that reactor 13 will perform the desired function of maintaining the value of current therethrough at a low magnitude such as indicated on Fig. 2 between times $t_2$ and $t_3$, it is necessary that this reactor be designed in accordance with the following equation:

$$E_d \times t = 2n\phi \times 10^{-8}$$

where $E_d$ = the direct current voltage of the converter such as exists between conductors 4 and 5.

$t$ = operating time in seconds of the interrupters such as 14.

$n$ = the number of turns on the direct current reactors 13.

$\phi$ = the total flux required to saturate the reactors 13 expressed in maxwells.

While I have shown and described a particular embodiment of the invention, I do not wish to be limited thereto and intend in the appended claims to cover all such changes and modifications as fall within the true spirit and scope of the invention.

What I claim as new and desire to secure by Letters Patent of the United States is:

1. In combination, a circuit including a first source of direct voltage and a normally saturated non-linear reactor having its reactance winding connected in series therewith, a second source of direct voltage connected in parallel with said circuit, said first and second sources of voltage normally having values bearing a predetermined relationship to each other such that current in said reactor is normally in one direction, and means having a direct conductor connection to said reactance winding for performing a control operation in response to a substantial increase in the voltage across said reactor due to a change in the normal relationship between the voltage of said first and second sources tending to cause a reversal of current of said reactor.

2. In combination, a circuit including a first source of direct voltage and a non-linear reactor having its reactance winding connected in series therewith, a second source of direct voltage connected in parallel with said circuit, said first and second sources of voltage normally having values bearing a predetermined relationship to each other such that current in said reactor is normally in one direction, said reactor being saturated at one polarity due to current in said one direction, and means having a direct conductor connection to said reactance winding for performing a control operation in response to a substantial increase in the voltage across said reactor due to a change in the normal relationship between the voltage of said first and second sources tending to cause a reversal of current and polarity of said reactor.

3. In combination, a circuit including a first source of direct voltage and a non-linear reactor having its reactance winding connected in series therewith, a second source of direct voltage connected in parallel with said circuit, said first and second sources of voltage normally having values bearing a predetermined relationship to each other such that current in said reactor is normally in one direction, said reactor being saturated at one polarity due to normal current in said one direction, and electromagnetic means having a direct conductor connection to said winding for performing a control operation in response to a substantial increase in the voltage across said reactance winding upon the occurrence of an internal fault in said first source tending to cause a reversal of current in reactor due to the voltage of said second source.

4. In combination, a circuit including a first source of direct voltage and a non-linear reactor having its reactance winding connected in series therewith, a second source of direct voltage connected in parallel with said circuit, said first and second sources of voltage normally having values bearing a predetermined relationship to each other such that current in said reactor is normally in one direction, said reactor being saturated at one polarity due to normal current in said one direction, and electromagnetic means having a direct conductor connection to said winding for performing a control operation in response to a substantial increase in the voltage across said reactance winding upon the occurrence of a substantial decrease in the voltage of said first source and the resulting tendency of the voltage of said second source to cause a reversal of current in said reactor.

5. In combination, a circuit including a first source of direct voltage and a non-linear reactor connected in series therewith, a second source of direct voltage connected in parallel with said circuit, said first and second sources of voltage normally having values bearing a predetermined relationship to each other such that current in said reactor is normally in one direction, said reactor being saturated at one polarity due to current in said one direction, and protective means for performing a control operation in response to a substantial increase in the voltage across said reactance winding due to a change in the normal relationship between the voltage of said first and second sources tending to cause a reversal of current and polarity of said reactor, said reactor having a volt-second rating equal to at least the product of the operating time of said protective means in seconds and the direct voltage of said second source.

6. In combination, a plurality of direct current circuits connected in parallel, a plurality of circuit interrupters each having an electromagnetic tripping mechanism and each being arranged in series with one of said circuits, and a plurality of normally saturated reactors each having its reactance winding connected in series with one of said circuits, the electromagnetic of the tripping mechanism of each interrupter having a direct conductor connnection to the winding of the associated reactor to effect operation of said tripping mechanism in response to a voltage across said reactance winding due to a fault condition in the associated circuit tending to cause a reversal of current therein.

7. In combination, a plurality of mechanical converters connected in parallel between an alternating current circuit and a direct current circuit, a normally saturated reactor having a reactance winding, a circuit interrupter connected in series with said winding in the line connecting each of said converters with said direct current circuit, each of said interrupters having a tripping mechanism including an electromagnet provided with an operating coil, direct electrical conductor connections from said operating coil to the terminals of said reactance winding of the associated reactor to effect operation of said tripping mechanism in response to the voltage across said winding due to a fault within its associated converter which tends to cause a reversal of current in said reactor.

8. In combination, a plurality of mechanical converters connected in parallel between an alternating current circuit and a direct current circuit, a normally saturated reactor and an interrupter connected in series in the line connecting each of said converters with said direct current circuit, each of said interrupters having a tripping mechanism connected to respond to the voltage across its associated reactor due to a fault within its associated converter, each of said reactors having a volt-second rating equal to at least the product of the tripping time of the interrupter in seconds and the direct current circuit voltage in volts.

9. In combination, a plurality of direct current circuits connected in parallel, a plurality of circuit interrupters each having a tripping mechanism and each being arranged in series with one of said circuits, and a plurality of normally saturated reactors each being connected in series with one of said circuits, the tripping mechanism of each interrupter being responsive to a voltage across the associated reactor tending to cause a reversal of current therein, each reactor being effective to maintain the current therethrough at a value substantially less than normal for a period of time at least as great as the time required for the associated interrupter to open its contacts and to extinguish the arc drawn therebetween.

10. In combination, a plurality of mechanical converters connected in parallel between an alternating current circuit and a direct current circuit, a normally saturated reactor and an interrupter connected in series in the line connecting each of said converters with said direct current circuit, each of said interrupters having a tripping mechanism connected to respond to the voltage across its associated reactor due to a fault within its associated converter and each of said reactors being effective to maintain the current therethrough at a value substantially less than normal for a period of time at least as great as the time required for the associated interrupter to clear the circuit after the occurance of a fault.

References Cited in the file of this patent

UNITED STATES PATENTS

| Number | Name | Date |
|---|---|---|
| 1,036,789 | Breckett | Aug. 27, 1912 |
| 1,792,099 | Kern | Feb. 10, 1931 |
| 2,057,531 | Livingston | Oct. 13, 1936 |
| 2,169,866 | Bedford | Aug. 15, 1940 |
| 2,305,380 | Edwards | Dec. 15, 1942 |
| 2,434,214 | Lerstrup | Jan. 6, 1948 |